United States Patent [19]

Kruesi

[11] Patent Number: 4,631,176

[45] Date of Patent: Dec. 23, 1986

[54] RECOVERY OF ANHYDROUS ZINC CHLORIDE

[75] Inventor: Paul R. Kruesi, Golden, Colo.

[73] Assignee: Cato Research Corporation, Wheat Ridge, Colo.

[21] Appl. No.: 400,947

[22] Filed: Jul. 22, 1982

[51] Int. Cl.$^4$ ................................................ C01G 9/04
[52] U.S. Cl. .................................... 423/100; 423/101; 423/491; 423/DIG. 14; 204/66
[58] Field of Search ....... 423/100, 101, 491, DIG. 14; 204/66

[56] References Cited

U.S. PATENT DOCUMENTS

| | | | |
|---|---|---|---|
| 1,388,086 | 8/1921 | Ashcroft | 204/66 |
| 3,441,372 | 4/1969 | Pegler et al. | 423/100 |
| 3,446,720 | 5/1969 | Brooks | 204/112 |
| 3,673,061 | 6/1972 | Kruesi | 204/105 R |

FOREIGN PATENT DOCUMENTS 1026951  2/1978  Canada .............................. 423/100

OTHER PUBLICATIONS

U.S. Bureau of Mines publication RI 8524, (1981).
Gmelins Handbuch der Anorganischen Chemie, Zink Achte Auflage, Verlag Chemie, (1956) pp. 871–875.
Nogueira, E. D., et al., "Winning Zinc Through Solvent Extraction and Electrowinning," E&MJ, 92–94 (Oct., 1979).
Thomas, B. K., et al., "Leaching of Oxidic Zinc Materials with Chlorine and Chlorine Hydrate," *Metallurgical Transactions B*, 12B:281–285 (Jun. 1981).
Forrest, V. M. P., et al., "The Extraction of Zinc and Cadmium by Tri-N-Butyl Phosphate from Aqueous Chloride Solutions," *J.Inorg. Chem.*, 31:187–197 (1969).
May, J. T., et al., "Dehydrating Magnesium Chloride by Double-Salt Decomposition," *Bureau of Mines Report of Investigations 8277*, pp. 1–19.
Allain, R. J., "A New Economic Process for Making Anhydrous Magnesium Chloride," TMS-AIME, p. 325 (Feb. 24–28, 1980).

*Primary Examiner*—John Doll
*Assistant Examiner*—Robert L. Stoll
*Attorney, Agent, or Firm*—Sheridan, Ross & McIntosh

[57] ABSTRACT

A process for the recovery of anhydrous zinc chloride from aqueous solutions containing zinc chloride and typical impurities, comprising: extracting zinc chloride onto a suitable organic extractant such as TBP; stripping the organic extractant with an organic reagent immiscible in the extractant, such as ethylene glycol; adding ammonia or other ammine donor to the loaded organic strip to precipitate a zinc chloride-ammine composition which may be decomposed to anhydrous zinc chloride by heating. The anhydrous zinc chloride is of high purity suitable for fused salt electrolysis to produce elemental zinc.

25 Claims, No Drawings

4,631,176

RECOVERY OF ANHYDROUS ZINC CHLORIDE

TECHNICAL FIELD

This invention pertains to the field of hydrometallurgy, in particular the recovery of a pure anhydrous zinc chloride product suitable for electrolysis to produce elemental zinc.

BACKGROUND OF THE INVENTION

Zinc is a widely useful metal and its chemical compounds have a number of important applications. It is recovered from both oxidic and sulfidic ores. Another source of zinc is from scrap. As zinc die castings are important in a number of applications, and in particular as components of automobiles, there is generated a large amount of zinc metal-containing scrap. In contrast to copper and lead where a large portion of this scrap is recycled back to primary products, in the case of zinc, only a small portion is recycled. An economic means of producing high purity metal from scrap is needed.

In the recovery of zinc from these materials, and in particular from sulfidic ores, it is common to roast the materials, producing noxious gases which are not totally recovered. This has led to a desire to develop alternative means, particularly hydrometallurgical means, which do not create the problems associated with zinc smelting. Aqueous electrolysis is one of these methods; however this method is made expensive by poor current efficiencies of the cells and by the fact that zinc sulfate solutions commonly used for aqueous electrolysis are relatively poor electrical conductors. This method is also expensive in that zinc is plated on cathode sheets from which it must be stripped, washed, dried and then melted.

Fused salt electrolysis is another method for recovering elemental zinc, however unless the starting material is anhydrous zinc chloride, moisture present in the feed will cause current inefficiency and carbon anode consumption. Prior methods for production of anhydrous zinc chloride, however, have been expensive and cumbersome.

Another problem associated with the use of anhydrous zinc chloride is caused by the extremely hygroscopic nature of this material.

Accordingly, a simple hydrometallurgical process for producing anhydrous zinc chloride is required. This invention provides such a process, and also produces an intermediate zinc chloride-ammine compound which is more stable than anhydrous zinc chloride, and may be washed and stored without absorbing moisture; but is easily decomposed by heating to form anhydrous zinc chloride.

PRIOR ART STATEMENT

A number of alternative processes have been suggested for the hydrometallurgical recovery of zinc. Many of these produce an aqueous zinc chloride solution.

In U.S. Pat. No. 3,673,061 to Kruesi, a process is described in which zinc sulfide is converted to an aqueous zinc chloride solution and elemental sulfur, thus avoiding the difficulties associated with smelting.

In treating oxidic zinc concentrates it has been well known to do a chloridizing roast at high temperature using sodium or calcium chloride. This has been effective in removing zinc from iron oxides as in pyrite cinders, but the subsequent recovery of the zinc has involved complex processes. One such process is described in E. D. Nogueira, et al., "Winning Zinc Through Solvent Extraction and Electrowinning," *E&MJ* (October 1979). Zinc chloride in aqueous solution is extracted with a secondary amine, stripped with water, then re-extracted with DEHPA, followed by stripping with dilute acid and electrowinning. While this approach is commercially successful, a great deal of cost would necessarily be involved in converting the zinc chloride to zinc sulfate for electrolysis as is usual with commercial electrolytic processes, and in the aqueous electrolysis itself.

Other sources of zinc include zinc oxides obtained as by-products in copper refining processes and electric arc steel making processes. B. K. Thomas et al., "Leaching of Oxidic Zinc Materials with Chlorine and Chlorine Hydrate," 12B *Metallurgical Transactions B* 281 (June 1981) describes a leaching process for these materials which produces an aqueous solution of zinc chloride.

The potential advantages of processes which might result in pure anhydrous zinc chloride which could be electrolyzed to pure zinc metal and recycle chlorine have long been recognized. As early as 1921 Ashcroft received U.S. Pat. No. 1,388,086 for a method of recovering zinc by producing zinc chloride in fused salt electrolysis. His methods were not practical in that the handling of ores in fused salts was difficult, and no provision was made for the generation and purification of the zinc chloride prior to electrolysis.

U.S. Bureau of Mines publication RI 8524 (1981) suggests a flowsheet for recovering zinc by fused salt electrolysis and recycling chlorine. The difficulty in the suggested process is the tremendous cost involved in the evaporation of water to produce anhydrous zinc chloride.

It has been recognized for some time that zinc chloride could be extracted from aqueous solution by certain organic reagents, specifically, tributyl phosphate has been known as an extractant for this purpose, as cited in U.S. Pat. No. 3,441,372 which describes the use of dilute sulfuric or nitric acid or dilute solutions of salts other than chlorides to strip the zinc from the extractant; and V. M. P. Forrest, et al., "The Extraction of Zinc and Cadmium by Tri-N-Butyl Phosphate from Aqueous Chloride Solutions," 31 *J. Inorg. Chem.* 187–197 (1969) which describes the effect of extractant dilution, metal ion concentration, and acidity on the extraction process. It has further been known that other organic reagents such as secondary amines, as described in U.S. Pat. No. 3,446,720 and Canadian Patent No. 1,026,951, could be used. Tertiary amines and quaternary amines salts have also been proposed for extracting zinc chloride from aqueous solution. A great deal of purification of zinc away from other impurities such as cadmium, divalent iron, etc., can be accomplished by the use of these reagents. When stripped by the use of various aqueous reagents, the zinc chloride or other zinc salt may be quite pure, but the cost and difficulty of producing anhydrous zinc chloride remains.

Magnesium chloride is also difficult to produce in pure anhydrous form, and so a number of studies have been made and methods developed for its production. U.S. Bureau of Mines Publication RI 8277, "Dehydrating Magnesium Chloride by Double-Salt Decomposition" (1978) suggests a process, starting with spray-dried magnesium chloride, which uses an organic amine hydrocarbon such as pyridine hydrochloride to form a complex with the magnesium chloride. When this compound is thermally decomposed, pure anhydrous magnesium chloride results.

R. J. Allain in a paper presented at the 109th AIME annual meeting (1980) entitled "A New Economic Process for Making Anhydrous Magnesium Chloride," suggests a process whereby aqueous magnesium chloride is mixed with ethylene glycol, the water removed by distillation, and magnesium chloride precipitated from the ethylene glycol with anhydrous ammonia. The ammine-magnesium chloride complex is then decomposed thermally to pure magnesium chloride and ammonia for recycle.

Although it is known that zinc will form ammine complexes (and particularly zinc diammonium chloride, which decomposes at about 270° C. to produce zinc chloride and ammonia) given the wide disparity between the chemistry of magnesium and zinc, it was surprising to find that one could precipitate a zinc chloride-ammine compound from alcohols or glycol. It was further surprising to find that an organic extraction agent could be stripped with another organic composition, and in particular that extraction agents which extract zinc chloride could be stripped of the zinc chloride by other organic reagents, such as ethylene glycol.

SUMMARY OF THE INVENTION

Anhydrous zinc chloride, suitable for fused salt electrolysis to produce elemental zinc, is produced from an aqueous solution containing zinc chloride. This aqueous solution may be generated by a number of processes for the dissolution of metals from ores, such as sulfidic and oxidic ores, from scrap, or from waste materials and by-products of other metallurgical processes. The aqueous zinc chloride solution may also include typical impurities such as cadmium, iron, lead and copper.

The zinc chloride is extracted onto an organic extractant known to the art, such as tributyl phosphate, primary, secondary, or tertiary amines and quaternary amine salts. The loaded extractant is then stripped with an organic reagent immiscible in the extractant. Suitable organic stripping agents include ethylene glycol, propylene glycol, furfural, the foregoing agents in an ethanol diluent, and pyridine hydrochloride in ethanol. Ethanol by itself is not a suitable stripping agent because of its solubility in kerosene which is used to dilute the organic extractant.

The organic stripping agent may be evaporated to product anhydrous zinc chloride; or preferably, ammonia or an ammine donor is used to precipitate a zinc chloride-ammine compound which may be thermally decomposed to produce a recycle ammine source and anhydrous zinc chloride.

The zinc chloride-ammine compound can be washed with alcohol or solvent and is quite stable. In contrast to zinc chloride, which is quite hygroscopic, the zinc chloride-ammine compound does not pick up substantial moisture from the air. This compound is readily decomposed to anhydrous zinc chloride and ammonia by heating.

This anhydrous zinc chloride may be used as feed to a fused salt electrolysis process for the production of elemental zinc, and will produce chlorine which may be recycled, for example, to a chloridizing roast, for producing an aqueous solution of zinc chloride. It may also be used for other applications, e.g., in batteries or as a catalyst in the conversion of coal to oil.

DETAILED DESCRIPTION OF THE PREFERRED EMBODIMENT

The starting material is zinc chloride in an aqueous solution which also contains typical impurities such as iron, copper, lead, cadmium, alkaline earths and alkali metals. The solution may contain zinc chloride in concentrations between about one gram per liter and about 150 grams per liter, and preferably between about 50 grams per liter and about 100 grams per liter. Other impurities may be present in the ranges of about 10 to about 100 grams per liter.

The process produces anhydrous zinc chloride of a purity in excess of 90% weight percent. Depending on the solvent extraction agent selected and the number of extraction stages, essentially all zinc in solution may be recovered, and the product may be of any desired purity, up to 100 weight percent.

The aqueous solution containing zinc chloride is first contacted with an organic extraction agent to selectively extract zinc chloride. Suitable extraction agents are known to the art, and include tributyl phosphate (TBP), primary, secondary, and tertiary amines and quaternary amine salts. Impurities which coextract with the zinc chloride depend on the extraction agent chosen and conditions under which the extraction is carried out. See, e.g., V. M. P. Forrest, et al., supra, for a discussion of cadmium and zinc co-extraction. The extraction agent chosen will depend upon the impurities present in the aqueous phase from which a separation is desired. Tributyl phosphate is preferred when no iron is present in the solution because it is an inexpensive solvent; however when iron is present, a secondary amine is preferred. It is desirable to dilute the extraction agent with an inert organic solvent carrier, such as kerosene, to lower its viscosity. A preferred composition is 50 volume percent TBP plus 50 volume percent kerosene. Amine extractants in various aliphatic or aromatic solvents are also suitable reagents for extracting zinc chloride. Secondary amine is used as a commercial extractant.

The loading of zinc chloride on the extractant is enhanced by the presence of high concentrations of chloride ion. Because hydrochloric acid may also load on the extraction agent, especially on tributyl phosphate, under certain conditions of pH and HCl concentration, and compete with the zinc chloride in loading, it is desirable that the aqueous solution have as low a free acid as is practical. A suitable aqueous feed might be at pH about 1 through pH about 5, and preferably pH about 2 to pH about 3, with about 3 to about 6 Normal ammonium chloride solution or about 1 to about 3 Normal sodium chloride solution used as a salting agent to increase zinc chloride extraction.

The solvent extraction process is carried out by contacting the aqueous zinc chloride solution with the extraction agent, preferably using multiple countercurrent stages. The organic to aqeuous ratio may vary according to the extractant and aqueous system chosen. An organic to aqueous ratio of greater than one to one is preferred. The number of stages preferred depends upon the concentration of zinc chloride in the aqueous phase and the desired separation from impurities. By this method between about 20 and about 100 weight percent of the zinc chloride present in the aqueous solution may be extracted, to produce a loaded extraction agent having a zinc chloride concentration of between about one and about 50 grams per liter.

The loaded organic extractant is next contacted with a stripping composition. Surprisingly, it has been found that an organic stripping agent may be used to strip an organic extractant. The stripping agent of this invention comprises an organic reagent which is immiscible in the extractant and its diluent. Suitable organic stripping compositions include ethylene glycol, propylene glycol, furfural, and pyridine hydrochloride, and most preferably a mixture of methanol and ethylene glycol which are inexpensive and readily available reagents. These reagents are largely immiscible in kerosene and other non polar organic solvents. Because of the relatively high viscosity at room temperature of some of these compositions, such as ethylene glycol, it may be desirable to operate at elevated temperatures, or with a diluent such as ethyl alcohol in the stripping composition. (Ethyl alcohol by itself is not suitable because of its solubility in the organic extractant. A solution of about 200 grams pyridine hydrochloride per liter ethanol is a suitable stripping composition. A preferred mixture contains about 75 volume percent ethylene glycol and about 25 volume percent methanol.

The loaded extractant is contacted with the stripping composition, preferably in multiple stages, and most preferably in about three stages, at a temperature of between about 20° C. and about 50° C., depending on the viscosity of the stripping composition, preferably ambient temperatures, for a contact time of between one and about three minutes. The ratio of strippant to extractant is between about one to one and about one to ten, and preferably about one to one.

Ammonia or an ammine donor may be added to the stripping composition prior to contacting it with the loaded extractant. The concentration of ammonia or equivalent ammine donor in the strippant should not be more than two moles per mole of zinc, or a soluble ammonia complex may form.

After stripping, anhydrous zinc chloride is recovered from the strippant through a zinc chloride-ammine composition. To the loaded strip is added a quantity of ammonia or an ammine donor such as, pyridine, so as to provide a total ammonia or ammine concentration sufficient to precipitate zinc chloride present as a zinc chloride-ammine solid. The amount of ammonia or ammine donor added to the loaded strippant will depend on the zinc chloride concentration in the strippant, and the amount of ammonia previously added as a stripping agent. Typically about two moles of the ammine donor per mole of zinc chloride are required. Here again, if too much ammonia or ammine donor is present, a different zinc chloride-ammine complex forms which may redissolve in the strippant and prevent separation.

The precipitation step is carried out at ambient temperatures.

After precipitation is complete, the product, which is quite stable, may be filtered and washed with ethanol, methanol or other suitable reagent. In contrast to zinc chloride, which is quite hygroscopic, the zinc chloride-ammine compound is much less so and does not pick up substantial moisture from the air.

The zinc chloride-ammine compound is readily decomposed to form anhydrous zinc chloride by heating to a temperature of at least about 270° C., and not more than about 500° C., above which temperature the zinc chloride becomes volatile. Preferably, the compound is heated to between about 350° C. and about 450° C. at ambient pressure. This decomposition may be deferred to be performed immediately prior to further processing requiring anhydrous zinc chloride, such as fused salt electrolysis to recover elemental zinc, in order to allow the material to be stored in its non-hygroscopic ammine form.

The ammonia produced in the decomposition process may be recycled, such as for addition to the loaded strippant to precipitate additional zinc chloride-ammine compound.

An alternative method for recovering anhydrous zinc chloride from the loaded strip, when insufficient ammonia or ammine donor is present in the stripping composition to form a solid zinc chloride-ammine precipitate, is by evaporation of the loaded strip to produce anhydrous zinc chloride product. Vacuum evaporation is preferred, as heat may cause the formation of detrimental alcoholates or glycates. Essentially all the zinc chloride present in the loaded strip is recovered as anhydrous zinc chloride by this method.

This invention produces a product of up to more than 99.9 weight percent purity, and by this method essentially all of the zinc chloride originally present in the aqueous solution may be recovered.

EXAMPLES

The invention is further illustrated by the following examples:

EXAMPLE 1

100 ml of an aqueous solution containing 190 g/l zinc as zinc chloride, and 300 g/l ammonium chloride, at a pH of 2 was contacted with an equal volume of a solvent which was 75 vol % tributyl phosphate and 25 vol % kerosene. Assay indicated that 45 g/l zinc (4.5 gms) had loaded on the solvent. 100 mls of 75 vol % ethylene glycol and 25 vol % ethanol was ammoniated with 0.76 gms ammonia and contacted with the tributyl phosphate. On settling two layers formed, the lower glycol layer having a white crystalline precipitate. Assay showed the solvent to have only 8 g/l (0.8 gms) remaining, 3.7 gms having been stripped in the one contact. The glycol-ethanol fraction was treated with 0.38 gms additional ammonia. The solids were filtered and washed with ethanol and dried. Their dry weight was 7.7 gms. They were heated to 300° C. and the final weight was 5.2 gms. The tributyl phosphate was contacted a second time with fresh glycol-ethanol-ammonia and an additional 6 g/l (0.6 gms) of zinc was stripped. No solid formed in this strip.

EXAMPLE 2

100 ml of an aqueous solution containg 190 g/l zinc as zinc chloride, and 300 g/l ammonium chloride, at pH 2, was contacted with an equal volume of 75 volume % tributyl phosphate and 25 volume % kerosene. The loaded solvent was contacted two times with equal volumes of a strippant mixture consisting of 75 volume % ethylene glycol and 25 volume % ethanol. It was then stripped with 100 ml of 10% caustic. The zinc found in the three strips was: 1st: glycol-ethanol 30 g/l (3.0 gms); 2nd: glycol-ethanol 7 g/l (0.7 gms); caustic strip: 0.1 gms. This example shows that the glycol-ethanol is effective in stripping the TBP solvent without ammonia being present.

EXAMPLE 3

An aqueous feed containing 84 g/l zinc as zinc chloride and 200 g/l NH$_4$Cl at a pH 2.9 was contacted with an equal volume of a solvent 50 volume % TBP and 50 volume % Kerosene. Assay of the raffinate showed that 10 g/l zinc had loaded upon the solvent. The solvent was stripped with an equal volume of ethylene glycol and assay showed 9 g/l zinc in the ethylene glycol. 30 ml (0.27 g zinc) of the ethylene glycol was placed in a flask and heated in a vacuum of 0.15 inches of mercury at a temperature of 160° C. The product anhydrous zinc chloride weighed 0.5 gms.

EXAMPLE 4

Three 50 ml samples of ethylene glycol containing 50 g/l Zn, 100 g/l Zn, and 200 g/l Zn, respectively, as anhydrous zinc chloride, were ammoniated with 1.14 gms, 2.0 gms and 3.23 gms respectively of ammonia. In each case a crystalline white precipitate formed. Upon the addition of 0.4 gms, 1.7 gms and 4.4 gms respectively of additional ammonia the precipitate redissolved. The example shows the precipitation of the diammonia zinc chloride in glycol with redissolution of the zinc chloride with the further addition of ammonia.

EXAMPLE 5

An aqueous solution containing 80 g/l zinc as zinc chloride, and 150 g/l, NH4Cl, at a pH of 3 was contacted with 50 ml of a tertiary amine solution, "Alamine 336," 30 volume % amine in 70 volume % kerosene. The loaded solvent was then contacted with 50 ml of 75 vol % ammoniated ethylene glycol in 25 volume % ethanol. The strippant was found to contain 12.9 g/l zinc.

EXAMPLE 6

50 ml of an aqueous solution containing 80 g/l zinc as zinc chloride, and 250 g/l ammonium chloride, at a pH of 3 was contacted with 50 ml of a quaternary amine, "Aliquat 336," comprising 30 volume % amine in 70 volume % kerosene. The loaded solvent was then contacted with 50 ml of 75 volume % ammoniated ethylene glycol in 25 volume % ethanol. The strippant alcohols were found to contain 16.9 g/l zinc.

EXAMPLE 7

50 ml of an aqueous solution containing 80 g/l zinc as zinc chloride, and 250 g/l ammonium chloride, at pH 3 was contacted with 50 ml of 75 volume % tributyl phosphate in 25 volume % kerosene. The loaded solvent was contacted with a solvent of 10 gms pyuridine hydrochloride in 50 ml of ethanol. The pyridine hydrochloride-ethanol solution was ammoniated and the white precipitate separated from the solvent. The precipitate weighed 2.9 gms and analyzed 13.9% Zn.

EXAMPLE 8

50 ml of tributyl phosphate solvent was loaded as in Example 7 and then stripped with 50 ml of furfural and then was ammoniated. A precipitate formed which was 45% Zn.

Although the foregoing invention has been described in some detail by way of illustration and example for purposes of clarity of understanding, it will be obvious that certain changes and modifications may be practiced within the scope of the invention, as limited only by the scope of the appended claims.

Although the foregoing invention has been described in some detail by way of illustration and example for purposes of clarity of understanding, it will be obvious that certain changes and modifications may be practiced within the scope of the invention, as limited only by the scope of the appended claims.

I claim:

1. A process for stripping zinc chloride from an organic extraction agent comprising contacting the loaded extraction agent with an organic composition immiscible in the extraction agent.

2. The process of claim 1 in which the organic stripping composition is selected from the group consisting of ethylene glycol, propylene glycol, furfural, pyridine hydrochloride in ethanol, and a methanol/ethylene glycol mixture.

3. The process of claim 1 in which the organic stripping composition is ethylene glycol.

4. The process of claim 1 in which the organic stripping composition is a mixture of methanol and ethylene glycol.

5. The process of claim 1 in which the organic stripping composition contains an ammine donor in an amount causing a zinc chloride-ammine precipitate to form.

6. The process of claim 1 in which the organic stripping composition does not contain ammonia or other ammine donor, and subsequent to being loaded with zinc chloride, the said stripping composition is evaporated to produce anhydrous zinc chloride.

7. The process of claim 1 in which pyridine is added to the loaded organic stripping composition to precipitate substantially all the zinc chloride as a zinc chloride-ammine compound.

8. The process of claim 2 in which an ammine donor selected from the group consisting of ammonia and pyridine is added to the loaded organic stripping composition to precipitate substantially all the zinc chloride as a zinc chloride-ammine compound.

9. The process of claim 8 in which the ammine donor is ammonia.

10. The process of claim 7 in which the zinc chloride-ammine compound is heated to form anhydrous zinc chloride.

11. A process for producing anhydrous zinc chloride from an aqueous solution containing zinc chloride comprising:
    (a) extracting zinc chloride on an organic extraction agent;
    (b) stripping zinc chloride from the extraction agent with an organic composition immiscible in the extraction agent;
    (c) precipitating a zinc chloride-ammine compound from the loaded strip with an ammine donor;
    (d) heating the zinc chloride-ammine compound to form anhydrous zinc chloride.

12. A process for producing anhydrous zinc chloride from an aqueous solution containing zinc chloride comprising:
    (a) extracting zinc chloride on an organic extraction agent;
    (b) stripping zinc chloride from the extraction agent with an organic composition immiscible in the extraction agent;
    (c) separating anhydrous zinc chloride from the loaded strip solution.

13. The process of claim 11 or claim 12 in which the aqueous solution containing zinc chloride is derived from the dissolution of scrap metal.

14. The process of claim 11 or claim 12 in which the aqueous solution contacting zinc chloride is derived from the leaching of ores containing at least one composition selected from the group consisting of zinc oxide and zinc sulfide.

15. The process of claim 11 or claim 12 in which the aqueous solution containing zinc chloride also contains at least one impurity selected from the group consisting of iron, copper, lead, cadmium, alkaline earth, and alkali metals, and the anhydrous zinc chloride product is substantially free of these impurities.

16. The process of claim 11 in which the ammine donor of step (c) is ammonia.

17. The process of claim 11 or claim 12 in which the extraction agent of step (a) is selected from the group consisting of tributyl phosphate and primary, secondary and tertiary amines and quaternary amine salts.

18. The process of claim 11 or claim 12 in which the organic stripping composition of step (b) is selected from the group consisting of ethylene glycol, propylene glycol, furfural, pyridine hydrochloride in ethanol, and a methanol/ethylene glycol mixture.

19. The process of claim 18 in which the organic stripping composition is ethylene glycol.

20. The process of claim 18 in which the organic stripping agent is a mixture of methanol and ethylene glycol.

21. A process for producing elemental zinc from an aqueous solution containing zinc chloride comprising:
   (a) extracting zinc chloride on an organic extraction agent;
   (b) stripping zinc chloride from the extraction agent with an organic composition immiscible in the extraction agent;
   (c) separating anhydrous zinc chloride from the loaded strip solution;
   (d) recovering elemental zinc from the anhydrous zinc chloride by fused salt electrolysis.

22. A process for producing elemental zinc from an aqueous solution containing zinc chloride comprising:
   (a) extracting zinc chloride on an organic extraction agent;
   (b) stripping zinc chloride from the extraction agent with an organic composition immiscible in the extraction agent;
   (c) precipitating a zinc chloride-ammine compound from the loaded strip with an ammine donor;
   (d) heating the zinc chloride-amine compound to form anhydrous zinc chloride;
   (e) recovering elemental zinc from the anhydrous zinc chloride by fused salt electrolysis.

23. The process of claim 21 or claim 22 in which the aqueous solution containing zinc chloride is derived from the dissolution of scrap metal.

24. The process of claim 21 or claim 22 in which the aqueous solution contacting zinc chloride is derived from the leaching of ores containing at least one composition selected from the group consisting of zinc oxide and zinc sulfide.

25. The process of claim 21 or claim 22 in which the aqueous solution containing zinc chloride also contains at least one impurity selected from the group consisting of iron, copper, lead, cadmium, alkaline earth, and alkali metals, and the elemental zinc product is substantially free of these impurities.

* * * * *